US011623165B2

(12) United States Patent
Lauber et al.

(10) Patent No.: US 11,623,165 B2
(45) Date of Patent: Apr. 11, 2023

(54) RETAINING APPARATUS, FUEL TANK FILLING INSTALLATION HAVING THE SAME, AND METHOD FOR RETAINING A FOREIGN FLUID FROM A FLUID

(71) Applicant: FAUDI Aviation GmbH, Stadtallendorf (DE)

(72) Inventors: Uwe Lauber, Weimar (DE); Matthias Aden, Rimbach (DE)

(73) Assignee: FAUDI Aviation GmbH, Stadtallendorf (DE)

( * ) Notice: Subject to any disclaimer, the term of this patent is extended or adjusted under 35 U.S.C. 154(b) by 0 days.

(21) Appl. No.: 16/695,525

(22) Filed: Nov. 26, 2019

(65) Prior Publication Data
US 2020/0164285 A1 May 28, 2020

(30) Foreign Application Priority Data
Nov. 27, 2018 (DE) ...................... 10 2018 129 984.2

(51) Int. Cl.
| | | |
|---|---|---|
| *B01D 17/04* | (2006.01) | |
| *B01D 17/12* | (2006.01) | |
| *C02F 1/40* | (2023.01) | |
| *B60K 15/04* | (2006.01) | |
| *B60K 15/03* | (2006.01) | |
| *C02F 101/32* | (2006.01) | |

(52) U.S. Cl.
CPC ........... *B01D 17/045* (2013.01); *B01D 17/12* (2013.01); *C02F 1/40* (2013.01); *B60K 15/04* (2013.01); *B60K 2015/03236* (2013.01); *C02F 2101/32* (2013.01)

(58) Field of Classification Search
None
See application file for complete search history.

(56) References Cited

U.S. PATENT DOCUMENTS

| | | |
|---|---|---|
| 6,641,738 B2 | 11/2003 | Hard |
| 6,860,972 B2 | 3/2005 | Balakrishnan et al. |
| 2010/0101984 A1* | 4/2010 | Roesgen .............. B01D 29/114 210/86 |

(Continued)

FOREIGN PATENT DOCUMENTS

| | | |
|---|---|---|
| DE | 2 303 633 | 9/1973 |
| DE | 10 2008 056 559 | 5/2010 |

(Continued)

*Primary Examiner* — Richard C Gurtowski
(74) *Attorney, Agent, or Firm* — Clark & Brody LP

(57) ABSTRACT

The invention relates to a retaining apparatus (1) having a filter element (3) in a fluid line (2) which can be flowed through in a flow direction (V) by a fluid (F) comprising a foreign fluid (X), having a volume flow control apparatus (5) by way of which the volume flow (S) through the fluid line (2) can be controlled, having a sensor device (6) by way of which the fraction of foreign fluid (X) in the fluid (F) can be determined, and having a control device (7) by way of which the volume flow (S) can be controlled by way of the volume flow control apparatus (5) in a manner dependent on the fraction of foreign fluid (X) in the fluid (F) as determined by way of the sensor device (6). The invention furthermore relates to a fuel tank filling installation having said retaining apparatus, and to a method for retaining foreign fluid from a fluid.

20 Claims, 2 Drawing Sheets

(56) References Cited

U.S. PATENT DOCUMENTS

2011/0048548 A1* 3/2011 Rahm .................. F02M 37/42
                                                                              137/351
2014/0216602 A1   8/2014  Kastner et al.
2016/0136554 A1*  5/2016  Swaminathan ...... B01D 17/045
                                                                              55/487

FOREIGN PATENT DOCUMENTS

| EP | 0 699 462 | 4/2000 |
|----|-----------|--------|
| WO | 2007/042501 | 4/2007 |
| WO | 2012/087382 | 6/2012 |
| WO | 2015/195524 | 12/2015 |
| WO | 2018/193002 | 10/2018 |

* cited by examiner

RETAINING APPARATUS, FUEL TANK FILLING INSTALLATION HAVING THE SAME, AND METHOD FOR RETAINING A FOREIGN FLUID FROM A FLUID

The invention relates to a retaining apparatus, to a fuel tank filling installation having said retaining apparatus, to a method for retaining a foreign fluid from a fluid, and to the use of the retaining apparatus for carrying out the method.

The prior art has disclosed devices and methods for separating oil from water or vice versa, for example in order to be able to remove oil from water or to be able to provide fuels with the lowest possible water fraction. For example, DE 2 303 633 A describes how coalescence can be effected by way of a permeable polyurethane foam, such that an initially present dispersion of water and a liquid gasoline hydrocarbon is separated into two layers as it flows through the polyurethane foam. Here, one of the two liquids collects on the polyurethane foam, whereas the other of the two liquids passes through the polyurethane foam. Once the collecting liquid forms relatively large droplets on the polyurethane foam, these can detach and form layers in accordance with their density, such that a liquid layer forms.

A problem here is that large filter units with large filter surfaces in relation to the volume flow, with very expensive filter media, are required in order that the foreign fluid can be removed from the fluid itself with high process reliability. Such a coalescence device is described for example in EP 0 699 462 B1.

It is therefore an object of the invention to create a compact, inexpensive and reliable facility for removing a foreign fluid from a fluid, wherein even large liquid volumes can be treated.

The invention relates to a retaining apparatus having a filter element in a fluid line which can be flowed through in a flow direction by a fluid comprising a foreign fluid, in particular by a dispersion or emulsion. The retaining apparatus has a volume flow control apparatus by way of which the volume flow through the fluid line can be controlled, and has a sensor device by way of which the fraction of foreign fluid in the fluid can be determined. Furthermore, the retaining apparatus has a control device by way of which, or by way of the control loop of which, the volume flow can be or is controlled by way of the volume flow control apparatus in a manner dependent on the fraction of foreign fluid in the fluid as determined by way of the sensor device.

This has the advantage that, in a manner dependent on the fraction of foreign fluid in the fluid, an adaptation of the volume flow is made possible, in particular also in automated fashion. Fluid and foreign fluid form, in particular, an emulsion. Surprisingly, in the case of a multiplicity of filter materials, it is specifically still possible to utilize a retaining, separating or coalescing action in the presence of small volume flows, which appear rather unsuitable for continuous operation. On the other hand, for as long as scarcely any foreign fluid or no foreign fluid is present, it is also the case that no retaining action is required, and the filter element can be flowed through with a high flow rate. In this way, a compact retaining apparatus with relatively inexpensive filter materials can be utilized, which can, as it were, intervene briefly only in the presence of an elevated foreign fluid fraction, by virtue of the flow speed being reduced and thus retention being effected at the filter material. Whereas storage within the filter material is sufficient for the retention of the foreign fluid, a discharge of the foreign fluid away from the filter element generally also occurs in addition to the retention in the case of a separation or coalescence. Depending on the filter element type, foreign fluid may either be only retained or else additionally also discharged. Variants of the retaining apparatus which also provide a discharge may also be referred to as a separating apparatus.

In an optional refinement, the volume flow control apparatus has a controllable pump and/or a control valve.

In this way, the volume flow can be adapted quickly as required.

In one embodiment, the control device has a limit value stabilizing program, in particular of the control loop, with an upper limit value for the fraction of foreign fluid in the fluid. Thus, a high volume flow is made possible for as long as the fraction of foreign fluid in the fluid permits this.

Furthermore, the filter element should be designed such that a retention and/or separation of the foreign fluid occurs at the filter element. By way of a filter element, it is specifically also possible for very fine dispersions to be broken up. It is preferable here for the filter element to be designed such that the retention or the separation of the foreign fluid at the filter element is greater in the presence of a relatively small volume flow than in the presence of a relatively large volume flow. Such filter elements make it possible for the retention or the separation to occur to a sufficiently high degree and for large delivery volumes to simultaneously be attainable.

In a more specific refinement, provision is made whereby the filter element is a coalescence element or a microfilter. The foreign fluid can be retained by way of this. The filter element may have a coalescence efficiency which, with regard to the foreign fluid to be separated, correlates with the volume flow of the fluid, in particular such that the coalescence efficiency increases if the volume flow decreases and the coalescence efficiency decreases if the volume flow increases. Thus, it is for example possible for a tank filling process to be slowed if too much water is present in the hydrocarbon or oil, in order to lower the fraction of water to a tolerable level by increasing the retention or the separation.

The filter element is preferably hydrophobic and/or lipophilic for the separation of water as foreign fluid. This makes it possible that the filter element duly retains the foreign fluid, in particular for example water, but nevertheless does not bind said foreign fluid, such that the foreign fluid can be discharged and the separation action remains high over the service life of the filter element. Alternatively, the filter element is preferably hydrophilic and/or lipophobic for the separation of a hydrocarbon or oil as foreign fluid. Thus, the hydrocarbon or oil are not bound and can be discharged.

In a preferred embodiment that deviates from this, the filter element is neutral with respect to the foreign fluid and is designed to store the foreign fluid. "Neutral" is to be understood in particular to mean filter elements which are not hydrophobic and are not lipophilic. Such neutral filter elements are particularly inexpensive and store the foreign fluid in the interior. Here, the storage capacity of foreign fluid in the filter element should be dependent on the pressure difference and/or the volume flow across the filter element. For example, microfilters are also suitable as a neutral filter element. A regeneration of such neutral filter elements can then be performed for example by purging with an increased purge volume flow. Then, the foreign fluid is, as it were, washed out. The purge volume flow is preferably conducted to a separating apparatus in order to separate the foreign fluid from the fluid.

In a specific embodiment, the sensor device is arranged upstream and/or downstream of the filter element in the flow direction, in particular in order to determine the fraction of foreign fluid in the fluid upstream and/or downstream of the filter element. A measurement point upstream of the filter element permits an early adaptation of the volume flow in the event of changes of the fraction of foreign fluid upstream of the filter element. By contrast, downstream of the filter element, it is possible to correctly determine how high the fraction of foreign fluid still is after the retention or separation. This yields particularly high process reliability. By way of a combination of the two measurement points, it is possible to realize both early intervention and monitoring with high process reliability.

For a compact design and precise control of the volume flow, it is expedient to arrange the sensor device at most 1 m, preferably at most 0.75 m and particularly preferably at most 0.5 m downstream of the filter element in the flow direction, in particular in order to determine the fraction of foreign fluid in the fluid downstream of the filter element.

In a specific refinement, the control device takes into consideration exclusively measured values from a sensor device which is arranged downstream of the filter element in the flow direction. An inexpensive refinement can be achieved in this way.

Particularly advantageous is a retaining apparatus in the case of which the fluid with the foreign fluid is a mixture, in particular a dispersion or emulsion, of hydrocarbon or oil and water, in particular water comprising a hydrocarbon or an oil, or a hydrocarbon or oil comprising water.

In an optional variant, provision is made whereby the sensor device has a sensor element for determining free water as foreign fluid in a hydrocarbon or oil as main constituent of the fluid. Thus, it is possible in particular for tank filling processes to be monitored with high process reliability. This is of particular importance in particular in the aviation industry owing to hazardous ice formation in the tank. DE 10 2008 056 559 A1 and WO 2007/042501 A1, for example, describe the manner in which such a sensor may be constructed.

Alternatively or in addition, the sensor device may have a pressure difference sensor or two or more pressure sensors for determining the pressure difference across the filter element. With such sensors, the fraction of foreign fluid in the fluid is determinable or determined by way of the sensor device indirectly by way of the pressure difference across the filter element. Furthermore, the control device may adapt the sensitivity of the volume flow control in a manner dependent on the pressure difference.

The retaining apparatus preferably has a collecting cavity in the region below or above the filter element, in which collecting cavity the foreign fluid to be separated off from the fluid can be collected. In particular, the collecting cavity should be arranged at the top if the foreign fluid has a lower density than the fluid and arranged at the bottom if the foreign fluid has a higher density than the fluid.

A collecting cavity of said type may be a depression in the fluid line. The collecting cavity preferably has an evacuation opening which, in particular, branches off from the fluid line. Thus, the foreign fluid can be discharged as required. For higher process reliability, a refinement is expedient in which the collecting cavity is assigned a fill level sensor arrangement for determining the foreign fluid contained therein. The collecting cavity can then, with particularly high process reliability, be emptied before it overflows. A collecting cavity may also be referred to as collecting sump.

In a further design variant, the fluid line is formed, in the region of the filter element, by a filter housing. This should be designed to be openable for the purposes of exchanging the filter element.

In a specific embodiment, the retaining apparatus has a bypass which is connected to the fluid line upstream and downstream of the filter element, the sensor device and the volume flow control apparatus in the flow direction, wherein the bypass is connected to the fluid line downstream of the filter element in the flow direction via a bypass valve. The bypass valve should shut off the bypass when in a first position and should conduct the fluid and foreign fluid back upstream of the filter element when in a second position. For this purpose, the bypass valve should, in the second position, shut off the fluid line, in particular downstream of the filter element. In this way, the fraction of foreign fluid in the fluid can be lowered further by repeated retention at the filter element.

The invention furthermore relates to a fuel tank filling installation having a retaining apparatus as described above and below, wherein the fluid line of the retaining apparatus is a fuel line. Such a fuel tank filling installation, whilst being of compact structural size, also permits mobile use, is inexpensive and permits, with high process reliability, filling of tanks of vehicles without a limit value of foreign fluid in the fuel being overshot. A typical undesired foreign fluid is water.

The fuel tank filling installation preferably has a storage tank upstream of the retaining apparatus in the flow direction. Said storage tank may be a static tank, a buffer store, a mobile tank or a tank installation with hydrants. Downstream of the retaining apparatus in the flow direction, there is preferably formed a tank filling opening. This is connectable to, or insertable into, a vehicle tank or tank filler neck.

The invention furthermore relates to a method for retaining a foreign fluid from a fluid, a volume flow of the fluid with the foreign fluid flowing in a flow direction through a filter element in a fluid line, in which method a fraction of foreign fluid in the fluid is determined, and in which method an adaptation of the volume flow is performed in a manner dependent on the fraction of foreign fluid in the fluid.

An advantage of this method is that an adaptation of the volume flow is performed in a manner dependent on the fraction of foreign fluid in the fluid, whereby a retention or coalescence effect present in the case of many fine filter media in the presence of a small throughflow can be used in order to utilize the retaining, separating or coalescing action thereof as required. For as long as scarcely any foreign fluid or no foreign fluid is present, it is also the case that no retaining action is required, and the filter element can be flowed through with a high flow rate. In this way, the method can be utilized with a compact retaining apparatus with relatively inexpensive filter materials, which can, as it were, intervene briefly only in the presence of an elevated foreign fluid fraction, by virtue of the flow speed being reduced and thus retention being effected at the filter material.

In one method option, provision is made whereby the adaptation of the volume flow is a reduction if the fraction of foreign fluid in the fluid overshoots a target value, for example the upper limit value.

Equally, the method may optionally be refined such that the adaptation of the volume flow is an increase if the fraction of foreign fluid in the fluid undershoots a target value, for example the upper limit value.

The volume flow should preferably be increased at most to a maximum value. This prevents the filter element from being damaged and excess fluid being supplied to downstream stations. Furthermore, a small pump with correspondingly limited maximum power is sufficient.

In one method refinement, provision is made whereby the adaptation of the volume flow is an interruption if the fraction of foreign fluid in the fluid overshoots a safety value. Thus, in the presence of an excessively high foreign fluid fraction, an emergency stop can be utilized in order to investigate the cause. Furthermore, an overloading of the retaining action of the filter element is prevented. The safety value should be higher than the optional upper limit value.

In one method variant, the adaptation of the volume flow is performed by way of control of a controllable pump and/or of a control valve. This is easy to manage and can in particular also be performed in automated fashion.

In a more specific method option, the determination of the fraction of foreign fluid in the fluid is performed upstream and/or downstream of the filter element. A measurement upstream of the filter element permits an early adaptation of the volume flow in the event of changes of the fraction of foreign fluid upstream of the filter. By contrast, downstream of the filter element, it is possible to correctly determine how high the fraction of foreign fluid still is after the retention, which yields particularly high process reliability. By way of a combination of the two measurements, it is possible to realize both early intervention and monitoring with high process reliability. A variant in which the method utilizes exclusively a measurement downstream of the filter element can be implemented particularly inexpensively.

In one possible method implementation, provision is made whereby the fluid with the foreign fluid is a mixture of hydrocarbon or oil and water, in particular water comprising a hydrocarbon or an oil, or a hydrocarbon or oil comprising water. Thus, either water is separated, whereby in particular drives and tanks can be protected. Conversely, the retention or separation of hydrocarbon or oil from water is particularly important for high environmental compatibility. The method is particularly advantageously performed in applications in which the main constituent of the fluid is a hydrocarbon or oil and the foreign fluid is free water. In this way, it is possible in particular for tank filling processes to be monitored.

In a specific application of the method, the fluid is introduced, downstream of the filter element, into a tank of a vehicle, preferably of an aircraft. By way of the method, a reliable tank filling process can be achieved, such that, for example, no ice forms in the tank, which could otherwise lead to a shortage in a supply to the drive, sensor errors, sensor damage and tank casing damage.

The adaptation of the volume flow is optionally additionally or alternatively performed in a manner dependent on a pressure difference across the filter element. The fraction of foreign fluid in the fluid can be determined by way of such a determination of a pressure difference. Use without other sensors is thus by all means possible. Furthermore, the sensitivity of the volume flow control can be adapted in a manner dependent on the pressure difference. This is expedient in particular with regard to a changing retention efficiency or coalescence efficiency of the filter element with increasing saturation with dirt, in order to perform the most exact possible control to a target value.

In a specific method refinement, provision is made whereby a saturation of the filter element with foreign fluid is reduced by virtue of the filter element being purged with an increased purge volume flow. In this way, the filter element can be regenerated, in particular without having to be dismounted or even exchanged. This purging is of particular significance in the case of filter elements which are neutral with respect to the foreign fluid. The purge volume flow should in particular be greater than the volume flow that would be utilized for the retention of the foreign fluid in a manner dependent on the fraction of foreign fluid in the fluid. Purging processes may be performed at regular intervals. Alternatively, the saturation of the filter element with foreign fluid may be monitored, for example by way of a determination of a pressure difference across the filter element. Purging processes may then be initiated as required if a saturation limit is overshot. The purge volume flow should, where possible, be diverted from the regular circuit, for example to a separate separating device.

The method is preferably performed using a retaining apparatus as described above and below.

The invention furthermore relates to a use of a retaining apparatus as described above and below for carrying out a method as described above and below. The advantages correspond in each case to those of the method and of the retaining apparatus as described above with regard to the various optional refinements.

It is pointed out that the retaining apparatus may also be referred to as separating apparatus or separator in the case of a separation of foreign fluid, the volume flow control apparatus may also be referred to as volume flow controller, the sensor device may also be referred to as sensor, and the control device may also be referred to as controller.

Further features, details and advantages of the invention will emerge from the wording of the claims and from the following description of exemplary embodiments on the basis of the drawings, in which:

Figure 1:
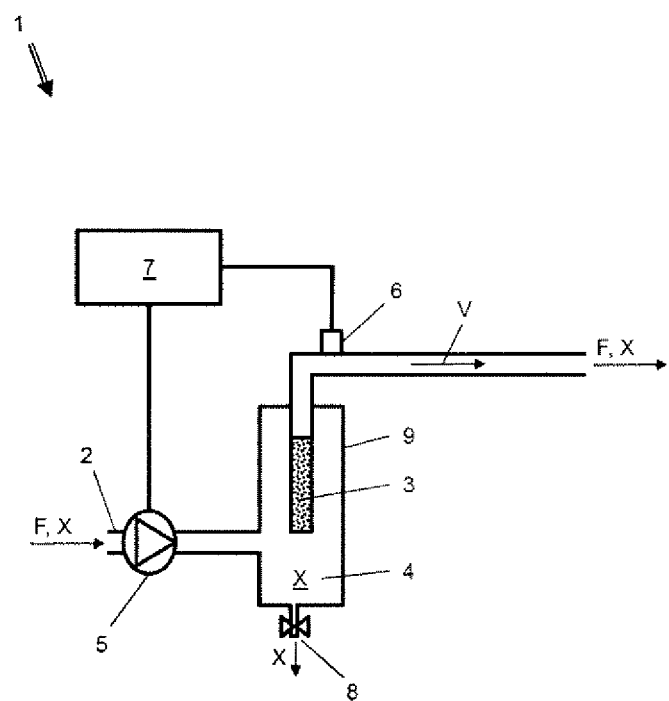
FIG. 1 shows a diagrammatic sketch of a retaining apparatus.

FIG. 1 shows a diagrammatic sketch of a retaining apparatus 1 which has a filter element 3 in a fluid line 2. The fluid line 2 and the filter element 3 are flowed through in a flow direction V by a fluid F comprising a foreign fluid X. By way of a volume flow control apparatus 5, specifically a controllable pump, the volume flow (see reference designation S in FIG. 2) through the fluid line 2 is controlled. The controllable pump is situated in the fluid line 2 in particular upstream of the filter element 3. In the region around the filter element 3, the fluid line 2 is formed by a filter housing 9. The filter element 3 is in this case flowed through from the outside to the inside.

In the lower region of the filter housing 9, that is to say in the region below the filter element 3, a collecting cavity 4 is formed in which foreign fluid X separated from the fluid F can collect. Said collecting cavity is, as it were, a depression in the fluid line 2, which can also be referred to as collecting sump. The collecting cavity 4 has an evacuation opening 8 which branches off from the fluid line 2. By way of an evacuation valve in the evacuation opening 8, collected foreign fluid X can be discharged from the collecting cavity 4. Optionally, the collecting cavity 4 may be assigned a fill level sensor arrangement for determining the amount of foreign fluid X that is present. In this way, it is then either possible for an alarm signal to be output for the purposes of manual evacuation of the collecting cavity 4, or else for the evacuation valve to be activated in automated fashion.

The filter element 3 is designed such that a separation of the foreign fluid X occurs at the filter element 3. In particular, the separation of the foreign fluid X at the filter element 3 is greater in the presence of a small volume flow than in the presence of a large volume flow. The filter element 3 has a coalescence efficiency which, with regard to the foreign fluid X to be separated, correlates with the volume flow of the fluid F, such that the coalescence efficiency increases if the volume flow decreases and the coalescence efficiency decreases if the volume flow increases. In particular, coalescence elements or microfilters are suitable for this purpose as filter element 3.

It is thus for example possible for a tank filling process to be slowed if too much water as foreign fluid X is present in the hydrocarbon or oil as fluid F, in order to lower the fraction to a tolerable level by increasing the separation. For this purpose, the filter element 3 should be hydrophobic or lipophilic.

Alternatively, use may also be made of a filter element which is neutral and which is designed to store the foreign fluid. For this purpose, said filter element may also be designed to be not hydrophobic and not lipophilic. Because such neutral filter elements do not involve any discharge of the foreign fluid, the collecting sump and the evacuation opening can be omitted.

To utilize the variable coalescence efficiency in the presence of varying volume flows, the illustrated variant of the retaining apparatus 1 has a sensor device 6 by way of which the fraction of foreign fluid X in the fluid F can be determined. The sensor device 6 or the measuring point thereof is arranged downstream of the filter element 3 in the flow direction V, in particular for the purposes of determining the fraction of foreign fluid X in the fluid F downstream of the filter element 3. Here, the sensor device 6 is situated preferably at most 1 m, preferably at most 0.75 m and particularly preferably at most 0.5 m downstream of the filter element 3 in the flow direction V. Alternatively or in addition, an arrangement of a sensor device 6 or measuring point upstream of the filter element 3 in the flow direction V is also possible, in particular for the purposes of determining the fraction of foreign fluid X in the fluid F upstream of the filter element 3.

In a possible use for separating water from a hydrocarbon or oil, the sensor device 6 should have a sensor element for determining free water as foreign fluid X in a hydrocarbon or oil as main constituent of the fluid F.

Furthermore, in order to utilize the variable coalescence efficiency in the presence of varying volume flows, the retaining apparatus 1 has a control device 7 by way of which, or by way of the control loop of which, the volume flow is controlled by way of the volume flow control apparatus 5, specifically the controllable pump, in a manner dependent on the fraction of foreign fluid X in the fluid F as determined by way of the sensor device 6. For this purpose, the control apparatus 7 has a limit value stabilizing program (this is a control loop) with an upper limit value (see reference designation Xmax in FIG. 2) for the fraction of foreign fluid X in the fluid F. Up to said upper limit value, the fraction of foreign fluid X in the fluid F is non-critical.

By way of the method, it is now possible for the fraction of foreign fluid X in the fluid F to be determined and for the volume flow to be adapted in a manner dependent on the fraction of foreign fluid X in the fluid F such that control is performed for adjustment to the upper limit value if this is overshot without control. The adaptation of the volume flow is a reduction if the fraction of foreign fluid X in the fluid F overshoots the upper limit value Xmax and is an increase if the fraction of foreign fluid X in the fluid F undershoots the upper limit value Xmax. The volume flow is however increased at most to a maximum value (see reference designation M in FIG. 2).

Figure 2:
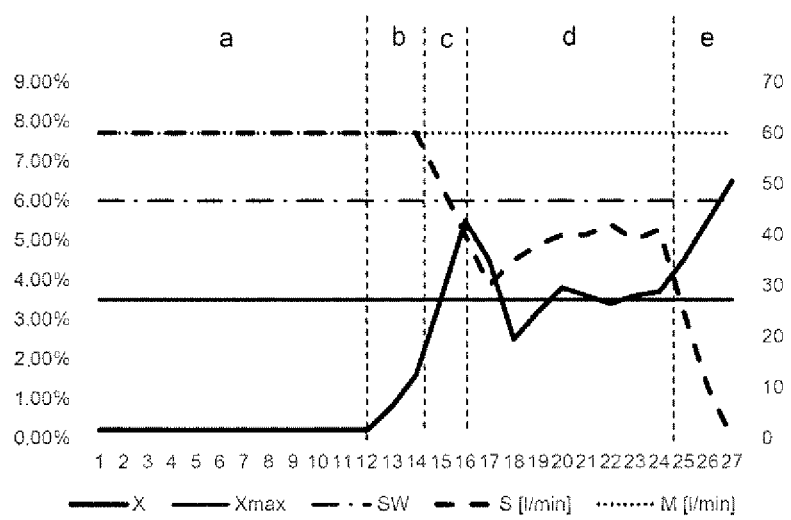
FIG. 2 shows a diagram in which the fraction of foreign fluid and the volume flow were plotted over a time period.

Additionally, the limit value stabilizing program should have a safety value (see reference designation SW in FIG. 2). Should this be overshot despite the efforts to perform control for adjustment to the upper limit value (see reference designation Xmax in FIG. 2), the volume flow control apparatus 5 and thus the volume flow (see reference designation S in FIG. 2) can be completely stopped. For this purpose, the safety value should be higher than the upper limit value.

Such a retaining apparatus 1 may be part of a fuel tank filling installation, such that the fluid line 2 of the retaining apparatus 1 is a fuel line, which may open, downstream of the filter element 3 and the sensor device 6 in the flow direction V, via a tank filling opening into a tank of a vehicle. A storage tank may be provided on the side situated upstream in the flow direction V.

Alternatively or in addition, the adaptation of the volume flow S may be performed in a manner dependent on a pressure difference across the filter element 3. For this purpose, it would be necessary for the pressure difference to be determined by means of a pressure difference sensor or two or more pressure sensors and transmitted to the control device 7 or to the limit value stabilizing program.

FIG. 2 schematically illustrates, in a diagram, how the fraction of foreign fluid X in the fluid F and the volume flow S may develop over a time period of 27 time units. In a first time period a from 0 to 12 time units, the fraction of foreign fluid X in the fluid F is approximately zero, and the volume flow control apparatus 5 provides a volume flow S at the level of a maximum value M.

In the time period b between 12 and 14 time units, the fraction of foreign fluid X in the fluid F increases but still lies considerably below the upper limit value Xmax.

The volume flow control apparatus 5 therefore continues to provide a volume flow S at the level of the maximum value M.

Then, in the time period c between 14 and 16 time units, the control device 7 realizes that the fraction of foreign fluid X is increasing further so quickly that it threatens to overshoot the upper limit value Xmax of 3.5%. The control device 7 therefore intervenes and counteracts this by throttling the volume flow S.

Subsequently, in the time period d between 16 and 25 time units, the fraction of foreign fluid X is firstly stabilized to the level of the upper limit value Xmax through adaptations of the volume flow S.

Finally, in the time period e between 25 and 27 time units, despite a very extensive lowering of the volume flow S, the fraction of foreign fluid X in the fluid F increases above the safety value SW of 6.0%, and the volume flow control apparatus 5 is deactivated.

In such a case, it would alternatively also be possible for the volume flow S to be conducted via a valve-controlled bypass back to a point upstream the filter element 3. In this way, it would be possible for the fraction of foreign fluid X in the fluid F to be further lowered by means of a further separation.

The invention is not restricted to any of the above-described embodiments, but may be modified in a variety of ways.

All of the features and advantages that emerge from the claims, the description and the drawing, including design details, spatial arrangements and method steps, may be essential to the invention both on their own and in a wide variety of combinations.

LIST OF REFERENCE DESIGNATIONS

1 Retaining apparatus
2 Fluid line
3 Filter element
4 Collecting cavity 5 Volume flow control apparatus
6 Sensor device
7 Control device
8 Evacuation opening
9 Filter housing
F Fluid
M Maximum value
S Volume flow
SW Safety value
D Flow direction
X Foreign fluid
Xmax Upper limit value

The invention claimed is:

1. A retaining apparatus (1) having
a microfilter (3) in a fluid line (2) which can be flowed through in a flow direction (V) by a fluid (F) comprising a foreign fluid (X),
a volume flow control apparatus (5) by way of which the volume flow (5) through the fluid line (2) can be controlled,
a sensor device (6) by way of which the fraction of foreign fluid (X) in the fluid (F) can be determined, and
a control device (7) by way of which the volume flow (5) can be controlled by way of the volume flow control apparatus (5) in a manner dependent on the fraction of foreign fluid (X) in the fluid (F) as determined by way of the sensor device (6), wherein the control device (7) has a limit value stabilizing program with an upper limit value (Xmax) as the fraction of foreign fluid (X) in the fluid (F) and a safety value (SW) also as a fraction of the foreign fluid (X) in the fluid (F), the control device configured to reduce volume flow (S) when the upper limit value (Xmax) is exceeded but the safety value (SW) is not exceeded to stabilize the fraction of foreign fluid (X) to the upper limit value (Xmax) and to deactivate volume flow (5) if the safety value (SW) is exceeded,
wherein the microfilter (3) is designed such that a retention of the foreign fluid (X) occurs at the microfilter (3), and
wherein the microfilter (3) is not hydrophobic and not lipophilic with respect to the foreign fluid (X) and designed to store the foreign fluid (X),
wherein the microfilter (3) is lipophobic.

2. The retaining apparatus (1) as claimed in claim 1, wherein the volume flow control apparatus (5) has a controllable pump and/or a control valve.

3. The retaining apparatus (1) as claimed in claim 1, wherein the microfilter (3) is neutral with respect to the foreign fluid (X) and is designed to store the foreign fluid (X).

4. The retaining apparatus (1) as claimed in claim 1, wherein the sensor device (6) is arranged upstream and/or downstream of the microfilter (3) in the flow direction (V).

5. The retaining apparatus (1) as claimed in claim 1, wherein the sensor device (6) is arranged at most 1 m downstream of the microfilter (3) in the flow direction (V).

6. The retaining apparatus (1) as claimed in claim 1, wherein the fluid (F) with the foreign fluid (X) is a mixture of hydrocarbon or oil and water.

7. The retaining apparatus (1) as claimed in claim 1, wherein the sensor device (6) has a sensor element for determining free water as foreign fluid (X) in a hydrocarbon or oil as main constituent of the fluid (F).

8. The retaining apparatus (1) as claimed in claim 1, wherein said retaining apparatus has a collecting cavity (4) in the region below or above the microfilter (3), in which collecting cavity the foreign fluid (X) retained from the fluid (F) can be collected.

9. A fuel tank filling installation having a retaining apparatus (1) as claimed in claim 1, wherein the fluid line (2) of the retaining apparatus (1) is a fuel line.

10. A method for retaining a foreign fluid (X) from a fluid (F), a volume flow (S) of the fluid (F) with the foreign fluid (X) flowing in a flow direction (V) through a microfilter (3) in a fluid line (2), the microfilter (3) being designed such that a retention of the foreign fluid (X) occurs at the microfilter (3), and further wherein the microfilter (3) is not hydrophobic and lipophobic with respect to the foreign fluid (X) and designed to store the foreign fluid (X), and in which method the following steps are performed:
a) determining a fraction of foreign fluid (X) in the fluid (F);
b) adapting the volume flow (S) in a manner dependent on the fraction of foreign fluid (X) in the fluid (F), wherein the adapting the volume flow further comprises:
i) establishing an upper limit value (Xmax) for the fraction of foreign fluid (X) in the fluid (F);
ii) establishing a safety value (Sw) for the fraction of foreign fluid (X) in the fluid (F);
iii) reducing the volume flow (S) when the upper limit value (Xmax) is exceeded but the safety value (SW) is not exceeded to stabilize the fraction of foreign fluid (X) to the upper limit value (Xmax), and deactivating the volume flow (5) if the safety value (SW) is exceeded.

11. The method as claimed in claim 10, wherein the volume flow (5) is increased if the fraction of foreign fluid (X) in the fluid (F) undershoots the upper limit value (Xmax).

12. The method as claimed in claim 10, wherein the adapting of the volume flow (S) is performed by control of a controllable pump and/or of a control valve.

13. The method as claimed in claim 10, wherein determining of the fraction of foreign fluid (X) in the fluid (F) is performed upstream and/or downstream of the microfilter (3).

14. The method as claimed in claim 10, wherein the fluid (F) with the foreign fluid (X) is a mixture of hydrocarbon or oil and water.

15. The method as claimed in claim 10, wherein the fluid (F) is introduced, downstream of the microfilter (3), into a tank of a vehicle.

16. The method as claimed in claim 10, wherein the adapting of the volume flow (S) is performed in a manner dependent on a pressure difference across the microfilter (3).

17. The method as claimed in claim 10, wherein a saturation of the microfilter (3) with foreign fluid (X) is reduced by the microfilter (3) being purged with an increased purge volume flow.

18. The method as claimed in claim 10, further comprising providing a retaining apparatus (1) having
the microfilter (3) in the fluid line (2) which can be flowed through in the flow direction (V) by the fluid (F) comprising the foreign fluid (X),
a volume flow control apparatus (5) by way of which the volume flow (S) through the fluid line (2) can be controlled,
a sensor device (6) by way of which the fraction of foreign fluid (X) in the fluid (F) can be determined, and
a control device (7) by way of which the volume flow (S) can be controlled by way of the volume flow control apparatus (5) in a manner dependent on the fraction of foreign fluid (X) in the fluid (F) as determined by way of the sensor device (6); and using the retaining apparatus when following steps (a) and (b).

19. The retaining apparatus (1) as claimed in claim 5, wherein the sensor device (6) is arranged at most 0.75 m downstream of the microfilter (3) in the flow direction (V).

20. The retaining apparatus (1) as claimed in claim 19, wherein the sensor device (6) is arranged at most 0.5 m downstream of the microfilter (3) in the flow direction (V).

* * * * *